(12) United States Patent
Adamson et al.

(10) Patent No.: US 8,265,261 B1
(45) Date of Patent: Sep. 11, 2012

(54) TELEPHONE CHANNEL PERSONALIZATION

(75) Inventors: Stephen Michael Adamson, San Antonio, TX (US); Richard Engle Moore, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 1283 days.

(21) Appl. No.: 11/617,174

(22) Filed: Dec. 28, 2006

Related U.S. Application Data (60) Provisional application No. 60/776,011, filed on Dec. 29, 2005.

(51) Int. Cl.
*H04M 3/00* (2006.01)
*H04M 5/00* (2006.01)
*H04M 1/64* (2006.01)

(52) U.S. Cl. ............... 379/265.02; 379/67.1; 379/88.2; 379/88.21; 379/245; 379/246

(58) Field of Classification Search ............ 379/265.02, 379/88.23, 88.18, 88.17, 114.13, 266.01, 379/88.2, 88.21, 67.1, 245, 246, 242, 88.19; 709/224

See application file for complete search history.

(56) References Cited

U.S. PATENT DOCUMENTS

| | | | |
|---|---|---|---|
| 6,856,673 B1 * | 2/2005 | Banks et al. | 379/114.13 |
| 7,065,188 B1 * | 6/2006 | Mei et al. | 379/88.23 |
| 7,272,212 B2 * | 9/2007 | Eberle et al. | 379/88.17 |
| 7,515,695 B1 * | 4/2009 | Chan et al. | 379/88.18 |
| 2003/0161464 A1 * | 8/2003 | Rodriguez et al. | 379/266.01 |
| 2004/0122941 A1 * | 6/2004 | Creamer et al. | 709/224 |

OTHER PUBLICATIONS

"IBM delivers new prepackaged WebSphere infrastructure software," IBM *WebSphere Application Server*, downloaded from the Internet on Nov. 11, 2005, 4 pages.
"Speech in the call center—a blueprint for success," *Microsoft Windows Server System*, 2005, downloaded from the Internet on Nov. 11, 2005, 4 pages.
"VoiceObjects: Turning too much into just enough: a professional approach to voiceXML application management," *VoiceXML*, 2005, 5(4), downloaded from the Internet on Nov. 11, 2005, 4 pages.
Customer Relationship Management:Optimizing the Inbound Phone Channel to better Reach your Customers, http://www.tmcnet.com/call-center/0905/customer-relationship-mngmnt-optimizing-inbound-phone-channel.htm, downloaded from the Internet on Dec. 28, 2006, 7 pages.

* cited by examiner

*Primary Examiner* — Thjuan K Addy
(74) *Attorney, Agent, or Firm* — Brooks, Cameron & Huesbsch, PLLC (57) ABSTRACT

The present invention is directed to systems and methods of personalizing a self-service option for customers. Customers are identified at call inception and the self-service channel is personalized to tailor the caller experience based upon information specific to each customer. The systems and methods of telephone channel personalization is company/provider driven, which allows the provider to control and personalize the caller experience based on criteria set by the provider. The telephone channel personalization systems and methods determine what choices to present to the caller (i.e., in a speech self-service application—what to say and how to say it). A personalized self-service channel reduces call time and enhances the caller experience and therefore is an attractive option for businesses utilizing a call-center model. The personalized self-service application caters to the needs of a particular customer and appears to the customer that the provider knows why they are calling. This level of personalization optimizes and greatly enhances the caller experience, shorten call duration, and lessen the number of "opt out to operators" selections—leading to improved operational capacity for the self-service channel.

43 Claims, 9 Drawing Sheets

BANK SPEECH — CALL FLOW

Top Level Prompter [1]

" Welcome to Comp-x Banking. When you hear the service you want, just say it.....

CHECKING , SAVINGS , CREDIT CARD , LOANS ."
(Can also say CD or IRA)

60

CHECKING →

- Authentication
- Open new acct                              (MSR)
- Account ID
- Pro - active Avail Bal
- Main Menu:
  - Available balance
  - Deposits
  - Checks paid
  - Withdrawals
  - Transfer funds
  - Other services
    > Bill pay    (3rd party)
    > Tax information
    > Order envelopes
    > Order checks    (3rd party)
    > Report lost card        (MSR)
    > Wire transfers            (MSR)
    > Change PIN
    > Open new acct            (MSR)
    - Rates
    > Representative            (MSR)
  - Main menu
  - Switch accounts

SAVINGS →  — 61

- Authentication
- Open new acct                              (MSR)
- Account ID
- Pro - active Avail Bal
- Main Menu:
  - Available balance
  - Deposits
  - Checks paid
  - Withdrawals
  - Transfer funds
  - Other services
    > Interest Rates (CD/IRA only)
    > Bill pay    (3rd party)
    > Order checks            (MSR)
    > Report lost card        (MSR)
    > Wire transfers            (MSR)
    > Change PIN
    > Open new acct            (MSR)
    - Rates
    > Representative            (MSR)
  - Main menu
  - Switch accounts

CREDIT CARD →  — 62

- Authentication
- Open new acct                              (MSR)
- Account ID
- Pro - active:
  - Available Balance
  - Lst stmnt date/amt
  - Lst pymnt amt/date
  - Nxt min amt/date
- Main Menu:                              — 63
  - Available Balance
  - Recent activity
  - Make a payment
  - Report lost card        (MSR)             — 64
  - Other services
    > Bill pay    (3rd party)
    > Statement questions    (MSR)
    > Balance transfers        (MSR)
    > Credit increase            (MSR)
    > Identity theft                (MSR)
    > Change PIN
    > Open new acct            (MSR)
    - Rates
    > Representative            (MSR)
  - Main menu
  - Switch accounts

} — 65

LOANS →

- Loan type
- Open new acct                              (MSR)
- Authentication
- Pro - active:
  - Balance/payoff amt
  - Loan Interest rate
  - Lst stmnt date/amt
  - Lst pymnt amt/date
  - Nxt min amt/date
- Main Menu:
  - 5- digit extension                        (MSR)
  - Auto
    > Account balance
    > Payoff amount
    > Make a payment
    > Title service                (MSR)
    > Other services
      ~ Bill pay    (3rd party)
      ~ Order envelopes
      ~ Coupon books        (MSR)
      ~ Interest paid
      ~ Car buying guide
      ~ Change PIN
      ~ Open new acct        (MSR)
      ~ Representative        (MSR)
      ~ Main Menu
    > Switch accounts
  - Home Equity
    > Account balance
    > Payoff amount
    > Make a payment
    > Other services
      - Bill pay    (3rd party)
      - Order envelopes
      - Coupon books        (MSR)
      - Interest paid
      - Change PIN
      - Open new account    (MSR)
      - Representative        (MSR)
      - Main Menu
    > Switch accounts
  - Mortgage    (MSR)
  - Other Loans
    (same options as Auto
    or Home Equity)

- Dynamic menu option, only offered if applicable
- All functions are self- service unless otherwise indicated 1 —  Even though it isn't verbalized at the Top Level Prompter, callers can say "Operator", "Representative", or press 0 to opt out. We then try to determine caller intent and obtain the caller's Comp-x # to route caller to the right place the first time. In addition, the Top Level Prompter error handling will play a prompt ..." for additional assistance, say Help". The Help prompt allows callers to say "Representative" or press 0.

TELEPHONE CHANNEL PERSONALIZATION

CROSS REFERENCE TO RELATED APPLICATIONS

The subject matter disclosed herein claims priority under 35 U.S.C. §119(e) to provisional U.S. Patent Application Ser. No. 60/776,011, filed Dec. 29, 2005, entitled "TELEPHONE CHANNEL PERSONALIZATION" which is hereby incorporated herein by reference in its entirety.

TECHNOLOGY FIELD

The subject matter described herein relates generally to telephone channel systems, and in particular to personalized self-service telephone channel systems and methods for improving call efficiencies and caller satisfaction. This technology is particularly suited, but by no means limited, for use by businesses in the financial services industry.

BACKGROUND

A majority of call center costs are a direct result of salary and benefits paid to employees. In an effort to reduce costs and increase overall operation of call centers, improved efficiency is a necessity. The big push for today's call centers is "operational capacity," that is, moving calls from a live agent into a self-service channel. This migration demands optimized self-service applications and must still result in a very satisfying caller experience. By improving a call centers "operational capacity," operational costs associated with employee salary and benefits can be greatly reduced.

Customers calling into companies having automated call centers are typically directed to standard speech recognition applications and hence all customers hear the same call flows and options. This model is inefficient in that a customer must listen to all the standard call flows and options even if the particular customer does not have or use each of the standard call flows and options. This results in increased call durations, which leads directly to increased costs per call. The use of standard call flows and options also waste other resources of the financial services company having the call center as well as wasting the time of the customer. Standard call flows and options are also impersonal to the caller and hence caller satisfaction is reduced. As a result, callers tend to disfavor automated call centers and prefer to speak in person to a live call center service representative. This defeats the purpose and benefits of automated call centers and results in increased costs for the company operating the call center.

One way companies attempt to streamline use of automated call centers is by having numerous de-centralized access numbers—basically, a different access number for each of the financial services company's different resources. By assigning different access numbers for each product or service covered by the call center, telephone calls received can be directly connected to the appropriate service person. While helping to streamline calls, this approach is difficult to manage and burdensome for customers. The financial institute must employ, advertise, and pay for multiple access numbers. Also, most customers have difficulty remembering multiple access numbers. Also, if a customer dials the wrong number, then the customer hears the wrong call flows/options and must default to a live call center service representative thus defeating the purpose and benefits of an automated call center.

Another way companies try and streamline use of automated call centers is through customer customization. Customer customization is where the customer sets preferences or defaults that then dictate the call experience. In this type of customized call system, the customer calls in and then customizes his or her experience for that call, and possibly future calls. This customized call center is customer driven and requires additional time and effort on the part of the customer. Hence, not all customers take advantage of this type of system.

Touch-tone voice recognition systems have been used for self-service telephone applications. In this type of system, the caller listens to a menu list of options and enters the appropriate selection by pushing a key on the dial corresponding to the desired menu choice. With conventional land-based telephones, these touch-tone applications work satisfactorily and have a relatively high accuracy rate. However, with the transition to cellular telephone, these conventional touch-tone applications are not practical and do not work as well. The reason for this is that with land-based telephones the receiver is at the ear and the hand of the caller can be on the dials to respond to the audio prompts being received via the telephone receiver. With cellular telephones, however, the receiver and dials are both on the cellular phone that therefore the caller must constantly move the cellular phone from the ear to a hand position in front of the caller to enter the appropriate response on the dials. This is inefficient and leads to caller errors in entering the correct key on the dials, reduced accuracy rates, and recalls.

What is needed is an automated self-service channel that solves the foregoing problems associated with conventional telephone channels and call centers.

SUMMARY

In view of the above shortcomings and drawbacks, systems, methods, and computer-readable media for telephone channel personalization are provided. The caller is identified at call inception to personalize the call flows and options for the customer allowing the caller experience to be and tailoring based upon one or more factors specific to the individual customer. This level of personalization would optimize and greatly enhance the caller experience, shorten call duration, and lessen the number of "opt out to operators" selections—leading to reductions in required personnel staffing and resulting cost savings.

A customer identifier used to identify the caller can include, for example, an Automatic Number Identifier (ANI), an account number, a member number, caller-identifying information, and the like.

Telephone channel personalization is company/provider driven, which allows the provider to control and personalize the caller experience based on criteria set by the provider. All that is needed is a caller identifier and the systems and methods of the present invention allow the provider to personalize the caller experience based on customer information. Telephone channel personalization provides for dynamic building of prompts personalized to a particular customer based on a customer profile automatically built from customer information accessed using a customer identifier obtained at call inception. This provides advantages over caller driven customized call systems in that, for example, no action is required by the caller.

A personalized self-service channel that reduces call time and enhances the caller experience is an attractive option for businesses utilizing a call-center model. This benefit is especially true of companies, such as financial services companies, having a wide array of products/services because the wider the array of products and services the greater the benefit to customers. Without call channel personalization, the call flows and prompts for a company offering a broad spectrum of products/services would be relatively long and inefficient if standard menus were used.

In one exemplary embodiment, a personalized self-service channel includes a call center system interface for receiving a call. A server in communication with the interface authenticates an identity of the customer making the call based on a customer identifier associated with the call. The system includes a database for storing customer information. The system uses the identifier as a key to access the customer information in the database specific to the customer making the call. A customer profile is built from the accessed customer information. Menu options are dynamically selected based on the customer profile and selected menu options are presented as personalized prompts to the customer.

In accordance with another aspect of the invention, the personalized telephone channel includes a business rules engine that invokes a set of business rules to analyze the customer information in the customer profile and also determines a content to play in the personalized prompts. The set of business rules are preferably determined by a provider of the personalized self-service channel. The set of business rules can also be used to determine an order of play of the personalized prompts based on the customer profile. Preferably, the business rules engine further includes rules-based personalization based on one or more of: logic constructs; and static constructs.

In accordance with another aspect of the invention, a prompt processor can be included for fulfillment of the selected menu options. In one embodiment, the personalized prompts can include: prompts built in textual form to be played to the customer; and a text-to-speech to engine for playing the personalized prompts to the customer. The text-to-speech engine may include a text-to-speech voice persona comprising a synthesized voice.

In another embodiment, the personalized prompts include concatenated pre-recorded words. An audio library can be provided having recordings of all words that could be selected as audio options for the personalized prompts. In this embodiment, the prompt processor concatenates the selected menu options into a complete sentence to be played as the personalized prompts to the customer. The recordings of all words that could be selected as audio options can include one or more of; up-prosody to be said at a beginning of a sentence, equity-prosody to be said at a middle of a sentence; and down-prosody to be said at an end of a sentence.

In yet another embodiment, the personalized prompts can include pre-recorded prompts. An audio library can be provided having recordings of the pre-defined prompts. The prompt processor selects the pre-defined prompts corresponding to the selected menu options from the audio library of pre-defined prompts to be played as the personalized prompts to the customer. The recordings of pre-defined prompts can include prompts recorded by a mainstream speech persona.

In accordance with another aspect of the invention, the personalized self-service channel includes a call center. Preferably, the call center comprises both automated call handling and live customer service representative call handling.

Customer information can include one or more of: customer personal information (e.g., customer name; an address; a phone number; a member number; an account number; a PIN; a password; etc.); customer call history; customer products; customer services; customer pending claims; customer pending applications; customer assets; and the like.

In accordance with another aspect of the personalized self-service channel, the self-service channel further comprises a speech self-service application. In another embodiment, the self-service channel further comprises an interactive voice response self-service application.

In accordance with another aspect of the personalized self-service channel, the self-service channel further comprises a single access telephone number and a plurality of lines of business comprising products and services. In one embodiment, selected menu options can include a first level of products and/or services serviced by a call center. Preferably, the first level of products and/or services includes at least one module representing a line of business, wherein the at least one module further comprises at least one financial services sector. The at least one financial services sector can include one of: insurance, banking, financial planning, security, brokerage, investments, pre-approvals, caller contact preferences, caller history, marketing campaigns, and the like.

In accordance with another aspect of the invention, the personalized self-service channel includes a second level personalized menu option dynamically selected under the personalized menu options based on the selected first level menu option and the customer profile. Preferably, the customer profile is shared across all modules serviced by the call center. Preferably, repetitive parts of a call are automatically captured and shared across all modules. Channel integration is also preferably provided to ensure customer receives consistent information across all products and services.

In accordance with another aspect of the invention, an incentives program is provided to drive customers to use the self-service channel. Preferably, financial incentives are awarded to customers for use of the personalized self-service channel.

In accordance with another aspect of the invention, the customer profile is developed using business rules having criteria set by a provider of the personalized self-service channel, and no action is required by the customer to build the customer profile. A template can be developed with all possibilities for products and services for the customer. A wizard having a business rule engine can be used to analyze customer information in the template, access individual pieces of audio recordings, and dynamically build prompts from the individual pieces of audio recordings.

Additional features and advantages of the invention will be made apparent from the following detailed description of illustrative embodiments that proceeds with reference to the accompanying drawings.

BRIEF DESCRIPTION OF THE DRAWINGS

The invention is best understood from the following detailed description when read in connection with the accompanying drawing. Included in the drawings are the following Figures that show various exemplary embodiments and various features of the present invention.

DETAILED DESCRIPTION OF ILLUSTRATIVE EMBODIMENTS

The present invention is directed to systems and methods to personalize the call flows and options for customers and members (hereinafter "customers") by identifying the caller at call inception (ANI, caller ID, caller input, etc.) and tailoring the caller experience based upon one or more factors, including but not limited to products owned by the customer, the customer data profile, recent solicits, recent pre-approvals, current product status, short-term and/or long-term caller history, other caller characteristics or behaviors, and the like. This level of personalization would optimize and greatly enhance the caller experience, shorten call duration, and lessen the number of "opt out to operators" selections—leading to reductions in required personnel staffing and resulting cost savings.

The systems and methods of telephone channel personalization is company/provider driven, which allows the provider to control and personalize the caller experience based on criteria set by the provider. All that is needed is a caller identifier and the systems and methods of the present invention allow the provider to personalize the caller experience based on customer information. This provides advantages over caller driven customized call systems in that, for example, no action is required by the caller.

The telephone channel personalization systems and methods determine what choices to present to the caller. For example, in a speech system—what to say. The systems and methods also determine how to present the prompts to the caller. For example, in a speech system—how to say it. The systems and methods provide for dynamic building of prompts personalized to a particular customer based on a customer profile automatically built from customer information accessed using a customer identifier obtained at call inception.

A personalized self-service channel that reduces call time and enhances the caller experience is an attractive option for businesses utilizing a call-center model. This benefit is especially true of companies, such as financial services companies, having a wide array of products/services because the wider the array of products and services the greater the benefit to customers. Without call channel personalization, the call flows and prompts for a company offering a broad spectrum of products/services would be relatively long and inefficient if standard menus were used.

The personalized call flows and prompts offered by the present invention provides a system having a more shallow (shorter) call flow and prompting tree that is personalized to include only the caller's products and services. Personal call flows and prompts including only those products/services associated with the caller are more efficient than the use of standard flows and prompts that include all of the products/services offered by the company. The personalized self-service application caters to the needs of the customer and appears to the customer that the provider knows why they are calling.

Preferably the telephone channel personalization system includes a minimum number of call-in or access numbers. For example, for an enterprise company (i.e., a company comprising multiple lines of business) or a company having line of business domain (i.e., the banking domain) with multiple departments, it is advantages for the company, and also for the customer, to minimize the number of access numbers to reduce costs and help customers remember the numbers. In this regard, it is preferred that a single call-in or access number be used to access multiple lines of business or multiple departments.

The personalized self-service channel provides a solution to customer resistance to automated call systems. This allows companies to improve "operational capacity" and realize the cost savings associated with moving calls from live agents to self-service channels.

One of the ways a company having a call center can better serve its customers is through a self service, speech recognition telephone prompting system. Preferably, the stimulus that causes an instance of this use case to be created is when a customer calls an all-inclusive centralized access number to financial services company resources. The all-inclusive centralized access number allows the customer to call a single number for all customer needs. Once a customer has dialed the centralized access number, the personalized self-service channel can authenticate the caller and the background system can collect all necessary product, status, and profile information about the customer. The system presents choices to the customer that it thinks the customer wants to hear based on the customer profile. The customer can complete his or her transaction in the self-service speech environment or preferably can be properly directed to a call center service representative for further assistance.

In addition, the call center can include a touch-tone prompting system. The touch-tone prompting system can be used in conjunction with or in lieu of a speech application. In a system having both speech and touch-tone applications, the system preferably only reverts to touch-tone if the speech is not recognized—such as might occur in a noisy environment.

Figure 1:
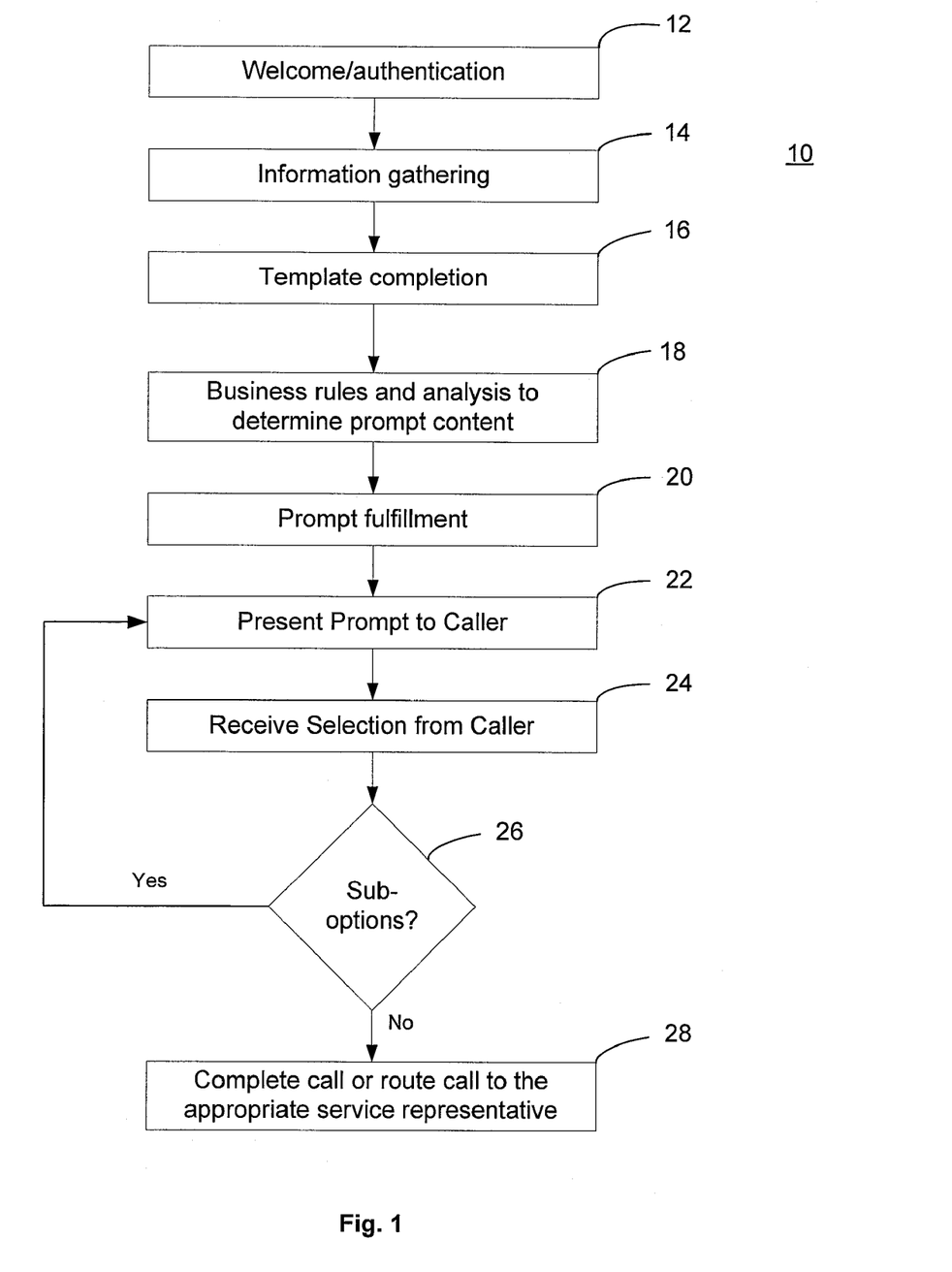
FIG. 1 illustrates an exemplary process for telephone channel personalization.

FIG. 1 is a flowchart illustrating an exemplary process 10 for self-service telephone channel personalization. As shown in FIG. 1, the process 10 begins with top level prompter, such as a welcome/authentication prompt to the caller (step 12) when the customer has phoned into the call center. Preferably, the caller is identified as soon as possible in the call process so that the next step in the process can be commenced. This can be accomplished by, for example, obtaining a piece of personal/identifying information from the call or caller.

Once the caller is identified, the personalization process begins with the gathering of the appropriate information specific to that caller (step 14). A profile for the caller is built, for example, by populating a template based on the caller identity, products/services for the customer, caller history, etc. (step 16). The personalization of the call is accomplished, at least in part, through a dynamic building of the caller profile.

Appropriate business rules are invoked to analyze the caller profile built from the information in the template and to determine the personalized flows and options, including the specific content for the prompts for that particular caller (step 18). The personalized prompts and menu options are generated and prepared for playing to the customer (step 20). Creating a personalized or customized menu based on the personal profile provides a more personal call experience and improves caller satisfaction, reduces call duration, and helps drives callers to a self-service channel helping to reduce costs.

The selected prompts and menu options are presented to the caller (step 22). Preferably, the prompts and menu options are presented to the caller in priority order as determined by the business rules. For example, the system would state the first option and each subsequent option until the options list has been exhausted. Preferably, the caller would be allowed to barge in when the appropriate prompt option is recognized. Preferably, the last option in the list is an opt-out option to allow the caller to exit the personalized call flows and prompts.

In a speech system, the caller states an option that is received by the system (step 24). In response, the system may present sub-options under the selected option (step 26). The system/process may include one or more sub-options under any given primary and/or previously selected sub-option and the caller can navigate through the presented sub-options. If there are no sub-options, the call may be completed or may be route to the appropriate customer service representative for further assistance (step 28).

Figure 2:
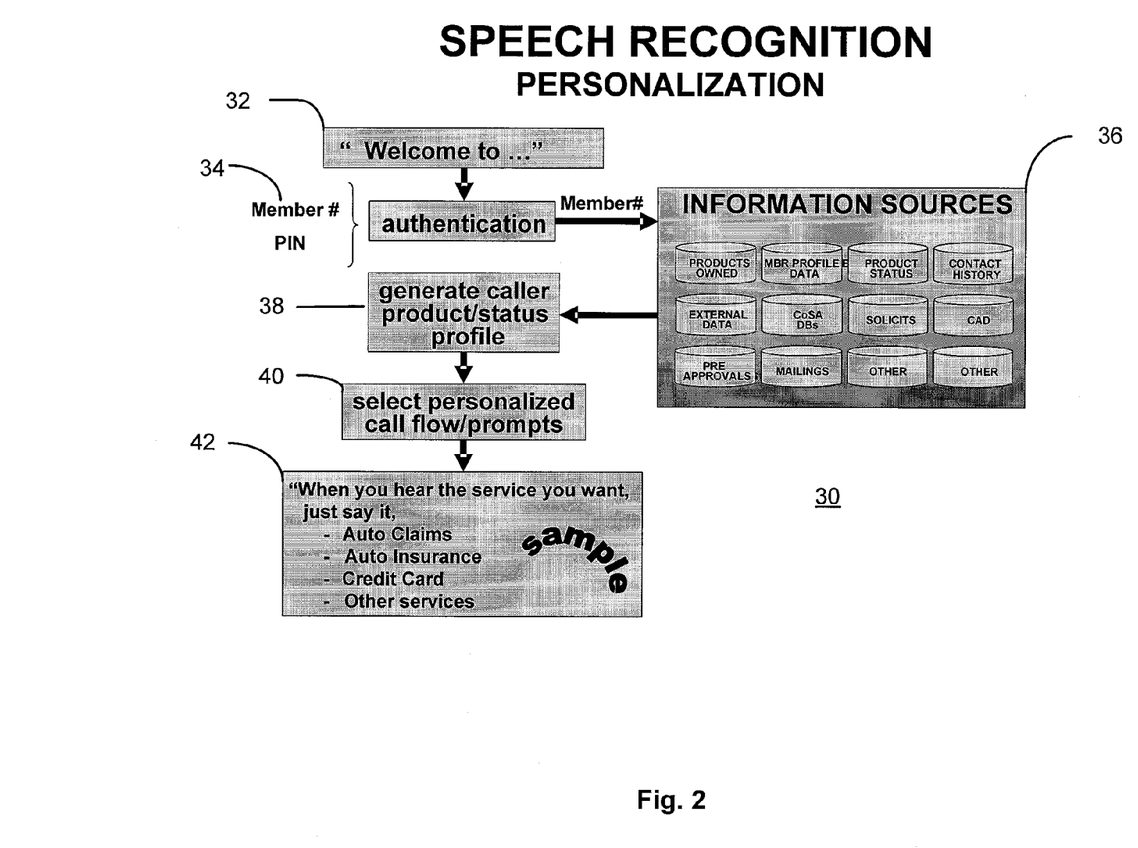
FIG. 2 illustrates an exemplary process for self-service speech telephone channel personalization.

FIG. 2 shows additional details of a speech recognition personalization process 30 for telephone channel personalization. As shown in FIG. 2, the caller is presented a welcome message (step 32). Identification and authentication of the caller is performed (step 34). During authentication the appropriate information is obtained to prepare for the caller information search.

Preferably, an identifier is obtained from the caller and is used as the trigger to commence the personalization of the call channel. For example, as shown in FIG. 2 a member number or PIN can be obtained and used as an identifier. The identifier can be used as a key to access the appropriate databases and find the appropriate customer information enabling more detailed and precise customer service to be achieved. Because databases may be architected using different keys, one or more identifiers may be obtain and used as a key. The identifier may be provided by the caller or automatically generated and transmitted as part of the call. For example, the identifier may include: a customer number, a member number, an account number, a password, a personal identification number (PIN), a name, an address, a phone number, a date of birth, a maiden name, other family name, a social security number (SSN), the caller's number—Automatic Number Identification (ANI), Caller ID, and the like.

The next step in the personalization process 30 is information gathering (step 36). One or more keys obtained during authentication are used to access and find customer information in one or more information sources. As shown in FIG. 2, a member number can be used as a key to access and find customer information in one or more information sources, such as databases.

As shown, exemplary information databases can include: Corporate Customer Information File (CCIF); member profile data; products owned/status; contact history (telephone inquiries, company web-site log-ins, received mail; marketing campaigns; pre-approvals; pending applications; Customer Account Decline (CAD) codes, e.g., deceased, bankruptcy, delinquent, etc.; open accident claim; active stock trader; and the like.

Figure 3:
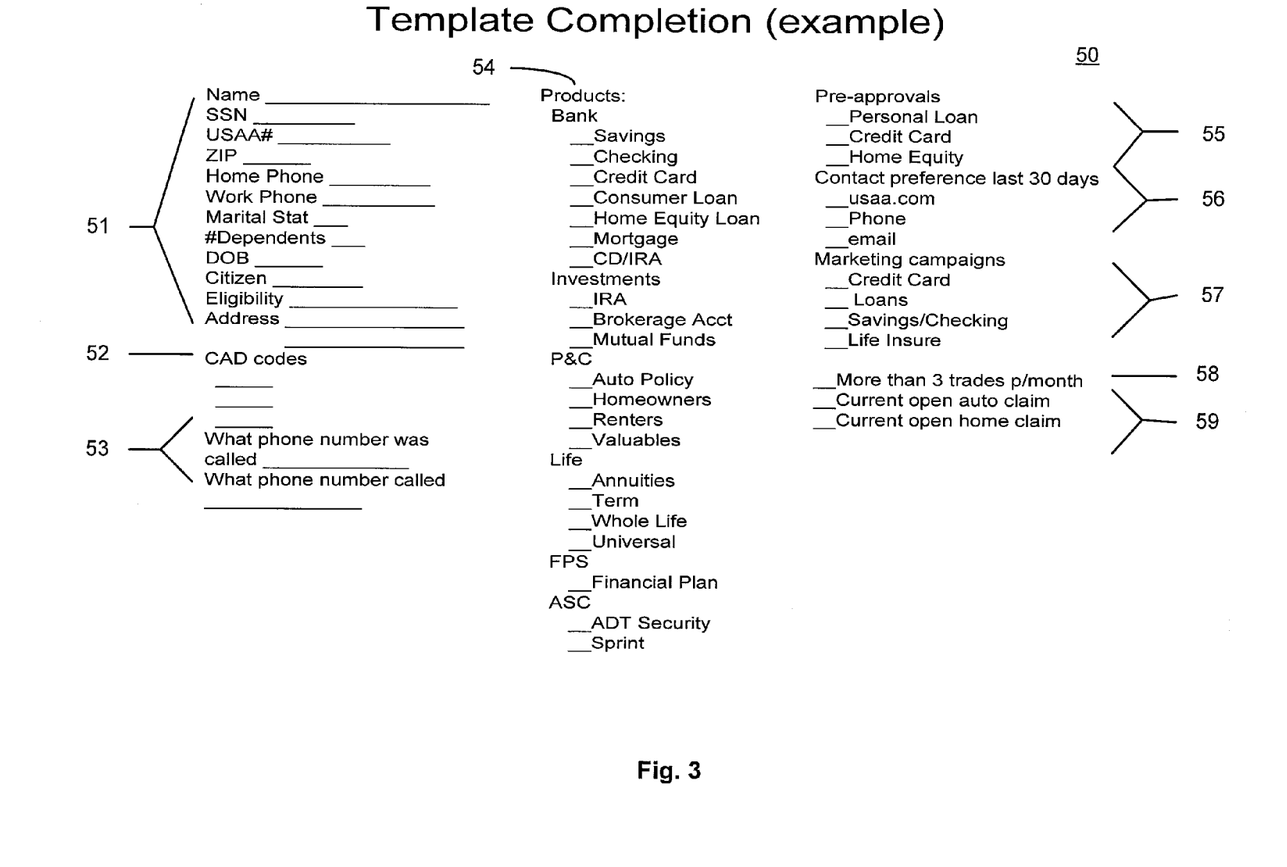
FIG. 3 is an exemplary template that can be populated from customer information.

Once the appropriate customer information has been gathered, a template is populated using the customer information (step 38). FIG. 3 shows an exemplary template 50. The information in the template 50 can include, for example, customer personal information 51, CAD codes 52, call information 53 (call origination, call designation, etc.), products 54 (banking, investments, P&C, Life, FPS, ASC, etc.), pre-approvals 55, contact preferences 56, marketing campaigns 57, trading history 58, open claims 59, and the like.

Referring back to FIG. 2, the personalization process 30 continues, at step 40, with the determination, selection, and prioritization of personalized call prompts. Business rules are invoked to analyze all information in the populated template. The business rules are used to determine the appropriate content to play in the return prompt to the customer. For example, this process could determine what departments the caller might want to talk to, what products the customer typically calls for self-service, how often the caller calls, if the caller is a "select" customer, etc. After the caller information is compiled and analyzed, the rules-based engine determines what content to respond with. These decisions would then be sent to the prompt processor for fulfillment.

The business rules guide the prompt option selection and order of play. In one embodiment, rules-based personalization can use logical constructs and marketing (i.e., if the customer has a bank savings account, should the caller be offered the ability to acquire a credit card?) for prompt selection. Static constructs can also be used including, for example, current products and services owned, caller history, pending open applications, pending claims, etc. The business rules can also be used to determine the priority for the prompt option selection and playback. For example, open and pending activities may be placed at a higher priority than high volume caller history. Information in the caller's personal profile, such as age, sex, marital status, children, military/non-military, etc. may also determine prompt selection. The business rules can be used to determine in priority order—what is most important to offer the caller. Preferably, an "other service" option is presented to the caller at the end of the prompt selection. The "other services" final option in the prompt is meant to catch errors in assumed caller intent.

Using information from the business rules engine, prompts are played to the customer (step 42). Prompts in a self-service speech application could be played in a number of ways, including: using text-to-speech to play a prompt using computer voicing to express the desired options; concatenate separate pre-recorded snipets of products and departments to "build" the appropriate response; select an entire pre-recorded prompt containing all appropriate responses; etc. FIG. 2 shows an exemplary self-service speech application that asks the caller to state the option that he or she desires when he or she hears it and that then plays the selected prompts to the caller.

In an embodiment that uses text-to-speech to play the prompts, the business rules engine builds a textual form of the prompt to be played. This text is forwarded to the text-to-speech engine for play to the caller. This form of persona usually lacks elegance in pronunciation, articulation, cadence, and prosody. The text-to-speech voice persona is a synthesized voice and does not usually match the persona in the main stream speech application.

In an embodiment that uses concatenated pre-recorded words, an audio library can be built containing recordings of all words that could be selected as audio options. Preferably, these words are recorded using several prosodies, e.g., down-prosody to be said at the end of a sentence, equity-prosody in the middle of a sentence, up-prosody as a question, etc. The audio components can be recorded by the mainstream speech persona to keep the application consistent and to deliver a pleasing caller experience. The business rules engine selects the appropriate options from the audio library. An example is provided below for a caller having a credit card, stock trade, and life annuity:

Audio Library (Example Subset):

| 091 | Credit Card | 027 | Mortgage | 017 | Auto Ins. | 623 | Life Annuity |
|---|---|---|---|---|---|---|---|
| 211 | Savings Acc. | 981 | Stock Trade | 224 | Boat Ins. | 502 | Property Ins. |
| 005 | Checking Acc. | 554 | Consumer Loan | 884 | Wire Transfers | 419 | Rental Car |
| 446 | Auto Claims | 391 | Auto Loan | 618 | Life Ins. | 743 | Stock Quote |

The selected prompts (as indicated in bold above) are then concatenated into a complete sentence and played to the caller. The caller then hears a personalized prompt: "When you hear the service you want, just say it . . . Credit Card, Stock Trade, Life Annuity, or Other Services."

In an embodiment having pre-recorded prompts, an audio library is built containing recordings of all possible prompts based upon use cases and business requirements. All audio prompts can be recorded by the mainstream speech persona to keep the application consistent and to deliver a pleasing caller experience. The Business Rules engine selects the appropriate prompt from the audio library. Using the same exemplary caller as above having a credit card, stock trade, and life annuity:

Audio Library (Example Subset):

| | |
|---|---|
| 017 | Credit Card, Savings Account, Consumer Loan, or Other Services |
| 181 | Credit Card, Wire Transfers, Auto Insurance, or Other Services |
| 482 | Credit Card, Homeowners Insurance, Stock Quote, or Other Services |
| 228 | Credit Card, Stock Trade, Life Annuity, or Other Services |
| 334 | Credit Card, Mortgage, Auto Claim, or Other Services |

The appropriate pre-recorded prompt (as indicated in bold above) is selected. The caller then hears a personalized prompt: "When you hear the service you want, just say it . . . Credit Card, Stock Trade, Life Annuity, or Other Services."

WORKING EXAMPLES

Scenario 1:

Stereotype: Bob is an active duty First Sergeant in the U.S. Marine Corps. He is married with two children, has two Company-x insured vehicles, and has no current pending claims. Bob has a Company-x credit card and would like to inquire about the account balance on the credit card.

Figure 4:
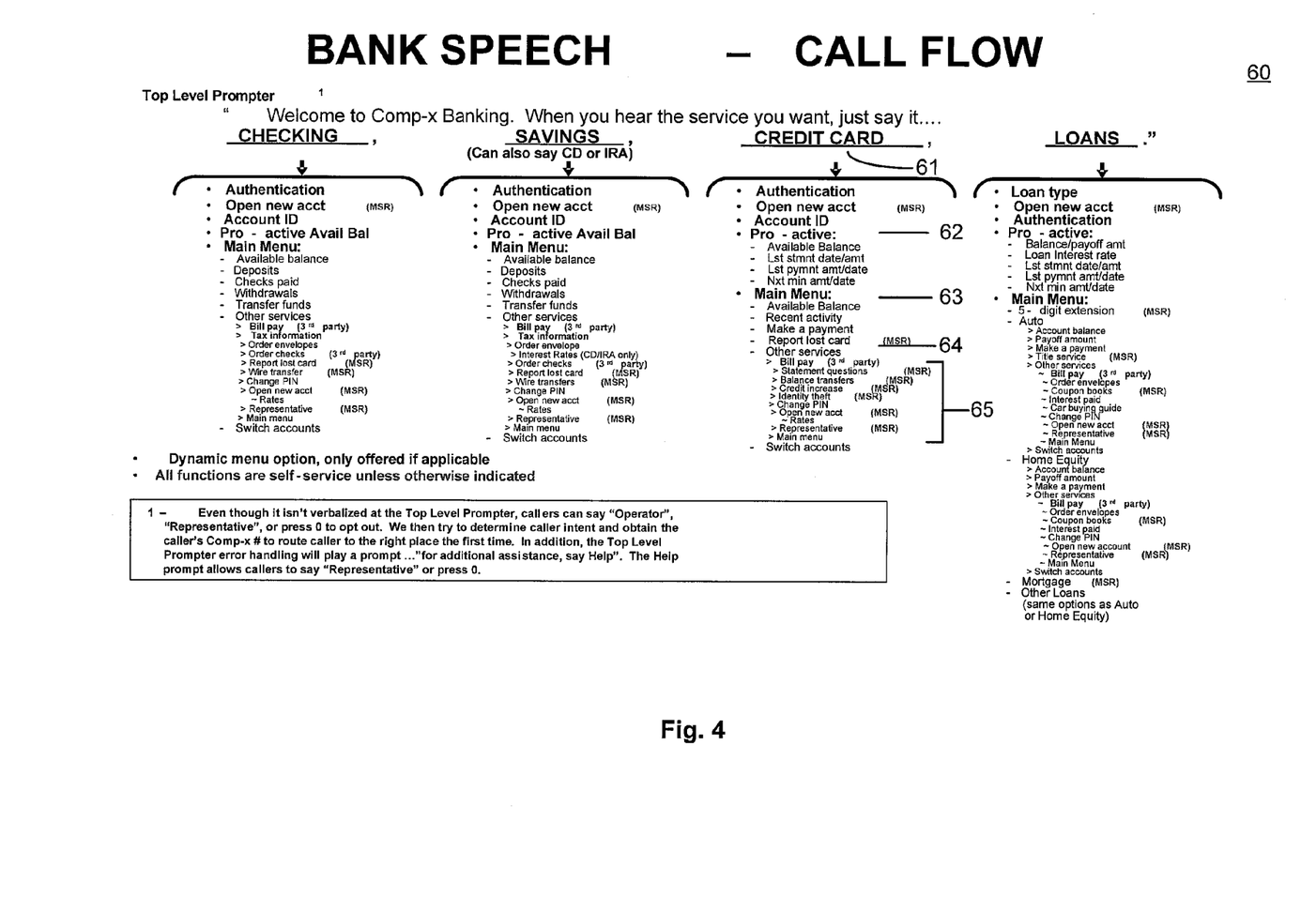
FIG. 4 is an exemplary call flow for a bank speech module.

1. The use case begins when Bob has phoned the central access number, has been authenticated, and customer information about his duty status, wife, children, insurance coverage, and credit card has been collected from associated systems. The customer information can be stored in a central database or a plurality of remote databases.
2. The system determines that since Bob has no pending claims and has a credit card that the best menu option to suit Bob's self-service needs is menu 1.
    2.1. Menu 1 contains, for example, sub-options for Company-x credit card and auto policy service.
3. The system presents the menu options to the caller by stating "When you hear the service you want, just say it."
    3.1. The system states "Company-x credit card;"
    3.2. The system states "auto policy service;"
    3.3. The system states "Other Services."
4. Since Bob is calling, in this example, regarding his credit card, Bob states "Company-x credit card."
5. Referring to FIG. 4, the system navigates to the bank speech application 60 and enters the application at the Credit Card module 61. The system verifies the caller has been authenticated, then may state a pro-active menu of most common items 62, for example:
    5.1 "Okay Credit Card,"
    5.2 "Your current balance is $437.32,"
    5.3 "Your last statement date was Apr. 12, 2005 in the amount of $893.41,"
    5.4 "Your last payment was received on April 28th in the amount of 893.41,"
    5.5 "Your next minimum amount due is $21.16 on the 12th of May."
6. The system may then states the takes the caller to the Credit Card Main Menu 63 to offer other self-service options, such as for example:
    6.1. "MAIN MENU, You can say:"
    6.2. "Balance,"
    6.3. "Recent Activity,"
    6.4. "Make a payment,"
    6.5. "Report a lost card,"
    6.7. "Other Services,"

As can be seen in FIG. 4, each sub-option under a selected line of business vertical (module or silo) can include one or more additional sub-options. For example, as shown in FIG. 4 under other services option 64, additional sub-options 65 can be provided.

7. If the caller were to select the "make a payment" option, the system could ask the caller if they would like to transfer funds from, for example:
    7.1 "transfer funds from checking account"
    7.2 "transfer funds from savings account"
    7.3 "transfer funds from another account"
8. If the caller selects the "transfer funds from checking account" option, the system can ask the caller the amount that the customer would like to pay, such as for example,
    8.1 "pay-off outstanding balance"
    8.2 "pay minimum amount due"
    8.3 "pay other amount"
9. If the caller selects the "pay-off existing balance," then the system can ask the customer to verify the transaction, for example:
    9.1 "please confirm transfer of funds in the amount of $437.32 from checking account to credit card account to pay-off existing balance of $437.32.
10. The system would initiate the process for completing the transaction.
11. The scenario ends.

As shown in FIGS. 3 and 4, the personalized telephone channel can include one or more layers or levels of personalization. For example, in the first level, the system identifies the modules (or verticals or silos) that the customer may be interested in based on the populated template of customer information (i.e., banking, investments, P&C, life, FPS, etc.). Once the caller makes a first selection (i.e., banking), a second level of personalization can occur based upon the selected module and the populated template of customer information. After the caller makes a second selection (i.e., credit card), a third level of personalization can occur based upon the selected sub-module and the populated template of customer information. When the caller makes a third selection (i.e., other services), a fourth level of personalization can occur based upon the selected sub-module and the populated template of customer information. For example, based on caller history, the system may present a fifth lever of personalization in which the caller is presented with the choices "change PIN" or "other services."

Scenario 2:

Stereotype: Jane is the spouse of Steve, an active duty Captain in the U.S. Army. Steve is deployed to Korea for one year and they have one small child. They live in an apartment and carry Company-x renter's insurance. In addition, they carry Company-x auto insurance and Jane recently had an automobile accident. She filed a claim with Company-x and wants to see if her settlement check has been mailed.

1. The use case begins when Jane has phoned the central access number, has been authenticated, and information about Jane and Steve's products, product status, and personal profile has been collected from associated systems.
2. The system determines that since Steve's auto policy has a pending claim, and Steve also carries renter's insurance, the menu option for Jane's self-service needs is menu 2.
    2.1. Menu 2 contains, for example, sub-options for auto claims, auto policy service, and renter's insurance service.
3. The system presents the menu options to the user by stating "When you hear the service you want, just say it".
    3.1. The system states "auto claim,"
    3.2. The system states "policy service,"
    3.3. The system states "renter's insurance,"
    3.4. The system states "other services."
4. Jane states, for example, "auto claim"
5. The system states "Please hold while I directly connect you to your claims handler."
6. The call is routed to the appropriate customer service representative for further assistance. The scenario ends.

Scenario 3:

The customer has a checking account with Company-x. This is the only product that the customer currently has with Company-x. The customer calls in to the call center and the caller is identified (either through caller input or an identifier transmitted with the call). The customer information is gathered and the business rules are invoked to develop the personalized call flows and prompts. In this case the system may include a touch-tone application. The caller is provided with a prompt that instructs the customer to press 1 for checking or press 2 for all other inquires.

The following week the same customer may apply for and receive a credit card from Company-x. The customer calls in to the call center and the system identifies the caller and personalizes the call flows and prompts. Now, the caller is provided with prompts that instructs the customer to press 1 for checking, press 2 for credit card, or press 3 for all other inquires.

As can be seen from the above exemplary scenarios, personalization is directed to an individual customer's needs and interests and allows other products and services to be left out of the flows and options presented to the customer during a call. This feature provides differentiated services and enhances the caller experience. Preferably, the flows and options include an opt-out option that would take the caller to a standard menu of flows and options or to a live customer service representative.

Figure 5:
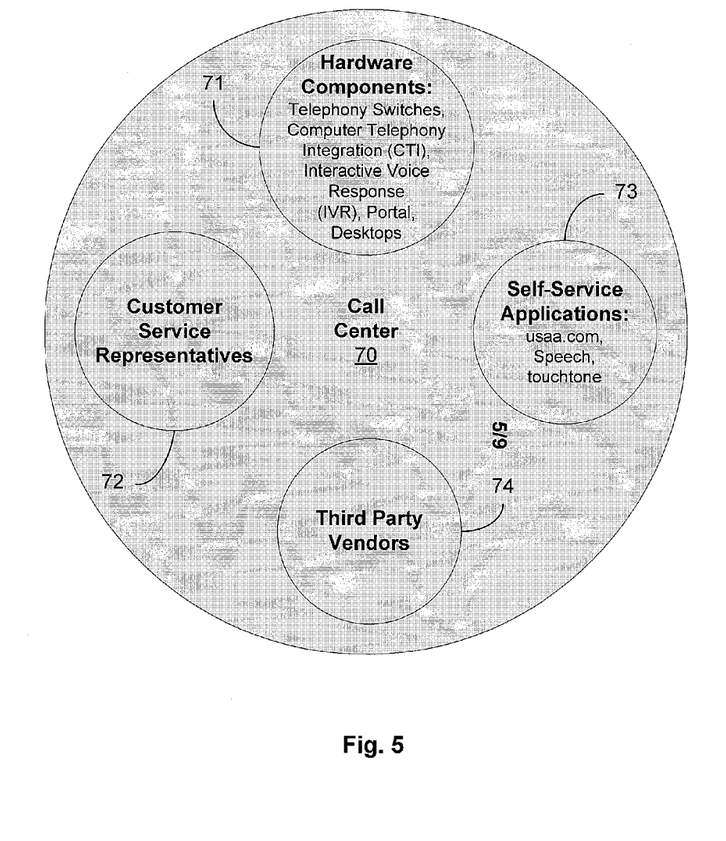
FIG. 5 shows an exemplary call center and call center domains.

The call center can include and be defined by a distinct domain or a combination of several domains. The definition sometimes depends on the point of view of the person evaluating the call center—for example, depending on whether the person has an IT or a line of business background may influence how ones describes a call center. As shown in FIG. 5, exemplary call center 70 can include one or more domains including, for example, (1) a hardware components 71 comprising, for example, telephony switches, computer telephony integration (CTI), Interactive Voice Response (IVR), portal, desktops, etc. (i.e. the hardware and software that route calls to the right place the first time); (2) customer service representatives 72 (i.e., the labor force) that service calls at the desktop; (3) self-service applications 73 including, for example, web-site interfaces, speech, touch-tone, etc.; and (4) third party vendors 74 including calls transferred out of the call center to third party vendors; or (5) combinations of the above domains. In a preferred embodiment of the telephone channel personalization, the call center includes a self-service speech application.

Figure 6A:
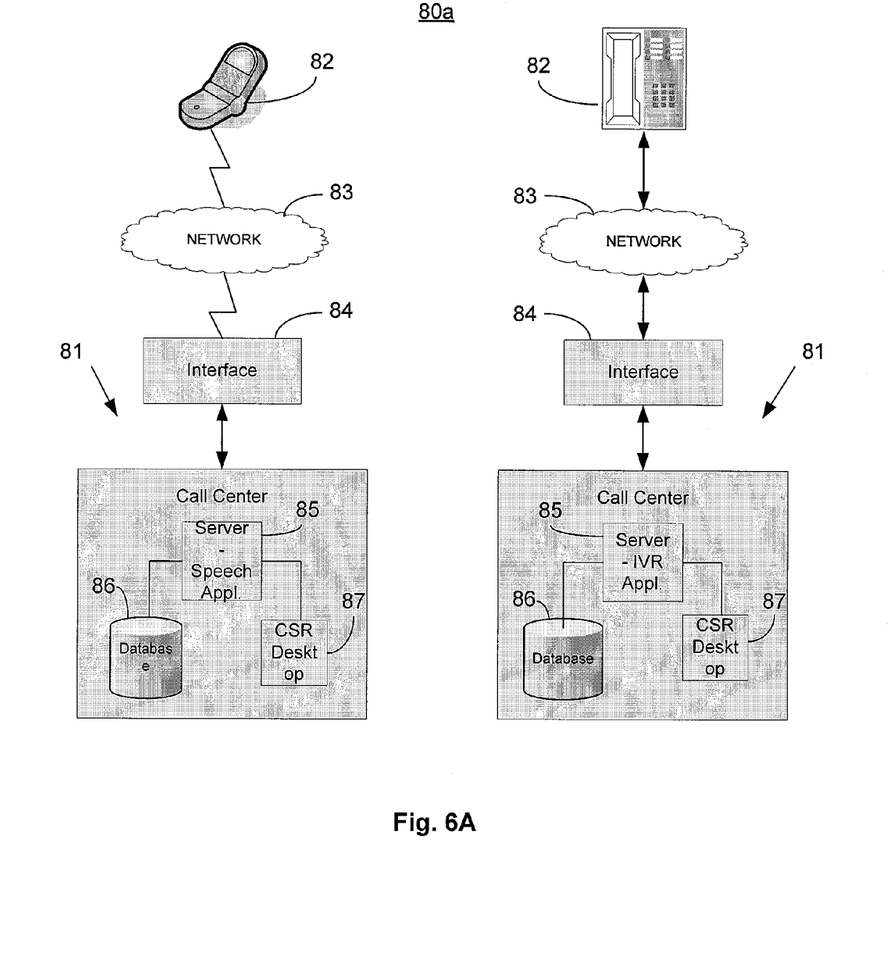
FIG. 6A shows an exemplary regional-centric call center system.
Figure 6B:
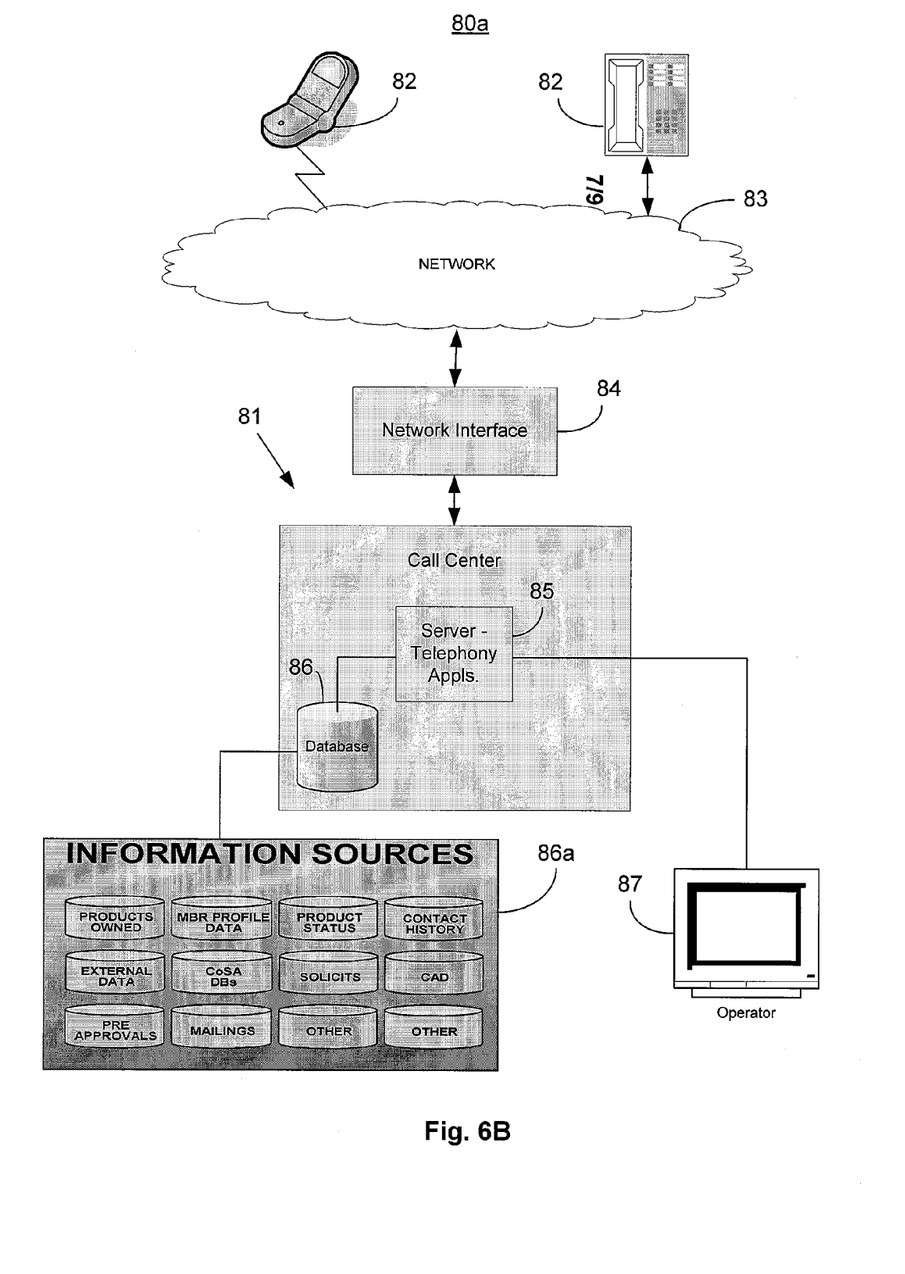
FIG. 6B shows an exemplary centralized call center system.

FIGS. 6A and 6B show exemplary call center models. FIG. 6A shows a region-centric call center system 80a and FIG. 6B shows a centralized call center system 80b. These call center models are provided for illustrative purposes only, and are not intended to limit the scope of the present invention. Either type of system, as well as other types of call center models, may be used with the telephone channel personalization system of the present invention.

As shown in FIG. 6A, the region-centric call center system 80a is a distributed call center system having a plurality of local call centers 81. This distributed call center system 80a enables service that is in close contact with the region (region-centric). As shown, the region-centric call center system 80a includes customer interface devices 82, such as, for example a telephone (land-based and/or cellular), that is in communication with a network 83, such as the Public Switched Telephone Network (PSTN), a cellular network, a VoIP network, a satellite network, etc. The network 83 is in communication with the call centers 81 through a call center network interface 84.

The call centers 81 includes one or more telecommunication servers 85. The server(s) 85 processes incoming calls and can control, for example: the authentication of callers, the gathering of information, the population of templates, invoking the business rules to analyze the information in the templates, determination of prompt content and order, fulfillment of the prompts, playing of prompts, etc. The server 85 can include a wizard having a business rule engine that runs the business rules. The server 85 can access one or more databases 86 storing customer information. Call center workstations 87, equipment, and operators can be placed at each such base.

The call center can include a speech application, an interactive voice response (IVR) application, or a combination of telephony applications, such as shown in FIG. 5. Preferably, in call center systems having integrated applications, the system is constructed to select the optimum operational mode—i.e., speech or IVR—for automated self-service customer interactions based on a balancing of customer and provider needs.

A speech recognition application provides caller self-service in an automated telephony solution. Speech recognition technology allows for automation of the prompt flows and options presented to callers and allows a caller to complete the desired transaction by simply asking for what they want. For example, the speech system can state a series of prompts to the caller and the caller may simply repeat the desired option. Speech applications in an automated environment generally allow calls to be handled in less time that with live agents, thereby shortening call duration, improving caller satisfaction, freeing live agents to handle more complex, high-value transactions, and the like. Speech applications generally provide higher levels of first call resolutions within the automated application leading to higher customer satisfaction and reduced costs.

The personalized self-service application in accordance with one preferred embodiment of the present invention helps drive providers and caller to a speech application. The reasons for this are that the self-service systems and processes of the present invention provide personalized menus having simplified grammar and less language in the selected menus as compared to standard menus listing all products and services offered by a company. Instead of the whole menu, the personalized telephone channel provides for the selection and presentation of a couple of items based on the caller and caller profile. Speech recognition in conjunction personalized telephone channel allows for the use of both land-based and cellular telephones with improved accuracies.

An IVR system is a telephone technology in which a caller uses, for example, a touch-tone telephone or speech application to interact with a call center to acquire information from or enter data into the database associated with the call center. IVR technology does not require human interaction over the telephone as the caller's interaction with the call center and database is predetermined by what the IVR system will allow the caller access to. For example, banks and credit card companies use IVR systems so that their customers can receive current account information without having to speak directly to a customer account representative. IVR technology can also be used to gather information from and about the caller.

FIG. 6B shows an exemplary centralized call center system 80b. A centralized call center system 80b includes customer interface devices 82, such as, for example a telephone, that is in communication with a network 83. To provide service to customers in all the based regions, a centralized call center system 80b typically employs long distance toll-free dialing. The network 83 is in communication with the call center 81 through a call center network interface 84. The call center 81 includes one or more servers 85 for processing the incoming call and controlling the personalization of the service channel. Handling of the calls in a centralized system 80b can be performed by a Computer Technology Integration (CTI) system at the call center 81.

The server 85 can access one or more databases 86 storing customer information. As shown, information databases 86a can include: Corporate Customer Information File (CCIF); member profile data; products owned/status; contact history (telephone inquiries, company web-site log-ins, received mail; marketing campaigns; pre-approvals; pending applications; Customer Account Decline (CAD) codes, e.g., deceased, bankruptcy, delinquent, etc.; open accident claim; active stock trader; and the like. Call center workstations, equipment, and operators 87 can be placed at the centralized call center 81.

It is contemplated that the communications between various components can be by various means, such as via hard-wired and/or wireless means. Also, the network can include various types of networks, such as one or more of a Local Area Network (LAN), a Wide Area Network (WAN), the Internet, etc. Preferably, voice and/or data information can be communicated between the various components in the personalized telephone channel system.

Preferably, the call center provides for multiple channel contact of the call center and integrates the various service channels to allow seamless integration of service across all service channels. For example, the call center may provide for contact from one or more of phone, email, web, chat, customer service representatives, etc. The call center preferably captures a customer identifier and gathers the appropriate customer information at the time of the initial contact with or point of entry into the call center, regardless of the channel used to commence the use. In this way, customers do not have to repeatedly enter personal access information every time they switch channels or access a different line of business or service module. Computer telephony integration (CTI) further facilitates seamless integration of service across multiple channels resulting in improved call processing time and customer satisfaction.

Figure 7:
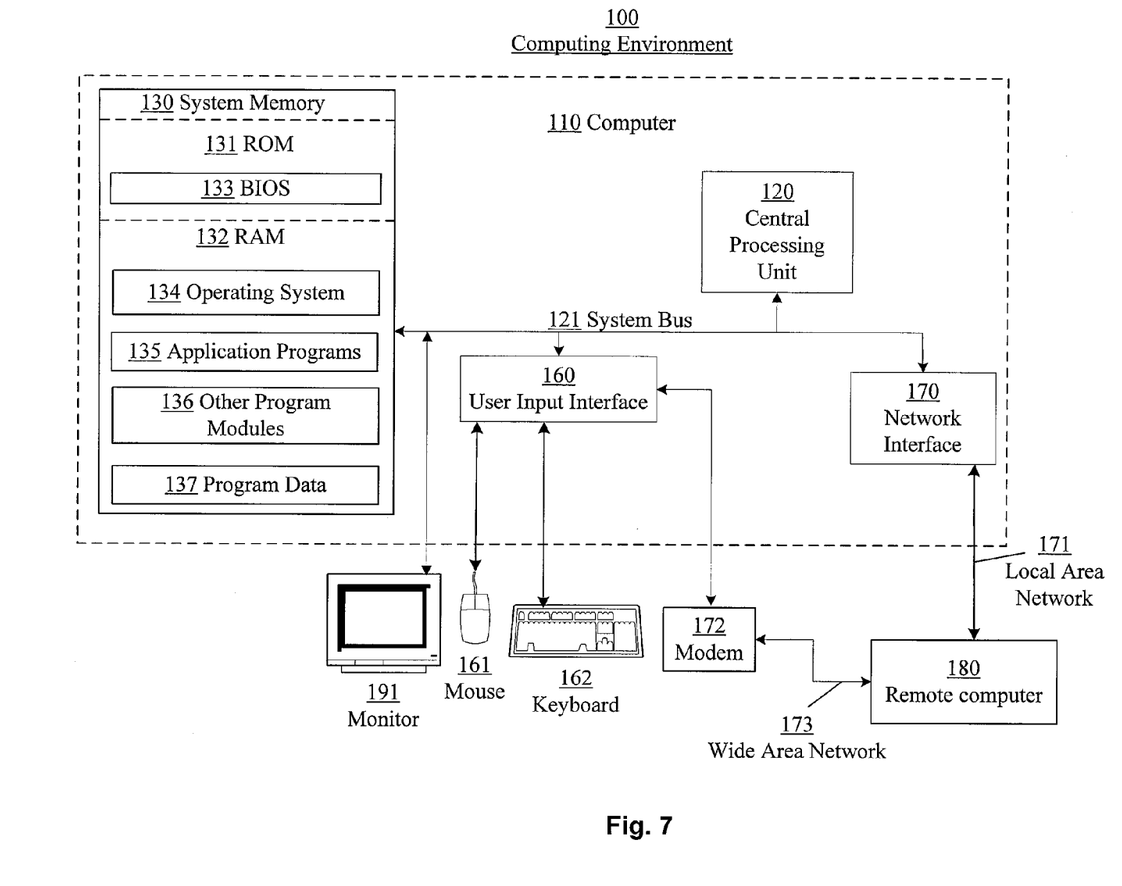
FIG. 7 depicts an exemplary computing environment on which an example embodiment of systems and methods of self-service telephone channel personalization may be implemented.

FIG. 7 depicts an example computing environment 10 on which an example embodiment of a combined account may be implemented. The computing environment 100 may include a computer 110, a monitor 191, and other input or output devices such as a mouse 161, a keyboard 162, and a modem 172. Computers and computing environments such as the computer 110 and the computing environment 100 are known to those skilled in the art and thus are briefly described here.

An example system for implementing an embodiment includes a general purpose computing device in the form of a computer 110. Components of the computer 110 may include a central processing unit 120, a system memory 130, and a system bus 121 that couples various system components including the system memory to the processing unit 120.

The system memory 130 may include computer storage media in the form of volatile and/or nonvolatile memory such as ROM 131 and RAM 132. A basic input/output system 133 (BIOS) containing the basic routines that help to transfer information between elements within computer 110, such as during start-up, may be stored in ROM 131. RAM 132 typically contains data and/or program modules that are immediately accessible to and/or presently being operated on by central processing unit 120. The system memory 130 additionally may include, for example, an operating system 134, application programs 135, other program modules 136, and program data 137.

Embodiments of the invention may be implemented in the computing environment 100 in the form of any of a variety of computer readable media. Computer readable media can be any media that can be accessed by computer 110, including both volatile and nonvolatile, removable and non-removable media.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110. The logical connections depicted in FIG. 7 include a local area network (LAN) 171 and a wide area network (WAN) 173, but may also include other networks. Such networking environments may be common in offices, enterprise-wide computer networks, intranets, and the Internet.

When used in a LAN networking environment, the computer 110 may be connected to the LAN 171 through a network interface 170. When used in a WAN networking environment, the computer 110 may include a modem 172 for establishing communications over the WAN 173, such as the Internet. The modem 172 may be connected to the system bus 121 via the user input interface 160, or other appropriate mechanism.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

An incentive program may be included in an effort to maximize operational capacity and drive callers to a speech self-service system. The incentive program may provide one or more of cash back, lower rates, discounts, reduced fees, reduced deductibles, and the like to customers that participate in the self-service telephone channel personalization system.

Figure 8:
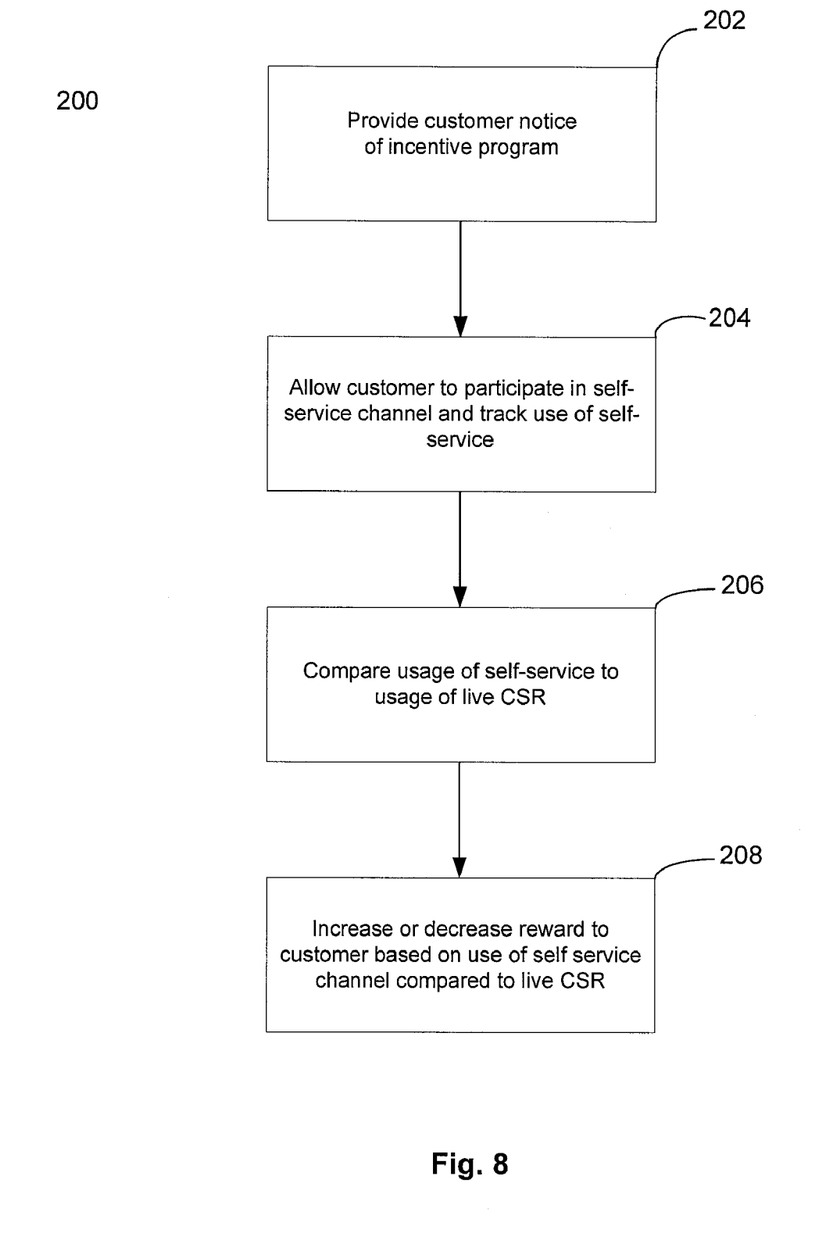
FIG. 8 shows an exemplary process for implementing an incentive program.

FIG. 8 shows an exemplary process 200 for implementing an incentive program. As shown, the provider provides notice of the incentive program to the customer (step 202). The provider tracks the customer use of self-service versus live service representatives (step 204). The financial institute compares the amount of calls made by the customer using self-service to the amount of calls made by the same customer to a live service representative (step 206). Preferably, the rewards to the customer are based on the comparison of the number of self-service calls to the number of calls to live service representatives. Preferably, the rewards to the customer increase as the ratio of the number of self-service calls to the number of calls to live service representatives increases, and conversely, the rewards to the customer decrease as the ratio of the number of self-service calls to the number of calls to live service representatives decreases (step 208). This provides an incentive to the customer to maximize use of the personalized self-service telephone channel, thus maximizing operational capacity and cost savings to the provider.

While systems and methods have been described and illustrated with reference to specific embodiments, those skilled in the art will recognize that modification and variations may be made without departing from the principles described above and set forth in the following claims. Accordingly, reference should be made to the following claims as describing the scope of disclosed embodiments.

What is claimed:

1. A personalized self-service channel system comprising:
   a call center system interface for receiving a call;
   a customer identifier associated with said call;
   a server in communication with said interface for authenticating an identity of a customer making said call based on said identifier;
   a database storing customer information;
   wherein said identifier is used by said server as a key to access said customer information in said database for said customer making said call;
   a customer profile built from said accessed customer information, wherein the customer profile includes information regarding the customer's relationship to a party; and
   menu options dynamically selected by said server based on said customer profile, wherein said selected menu options are presented as personalized prompts to said customer via said call center system interface and a reward is provided to said customer based on a usage of said personalized self-service channel by said customer.

2. The personalized self-service channel system of claim 1, further comprising a business rules engine that invokes a set of business rules to analyze said customer information in said customer profile and determines a content to play in said personalized prompts.

3. The personalized self-service channel system of claim 2, wherein said set of business rules are determined by a provider of said personalized self-service channel.

4. The personalized self-service channel system of claim 2, further comprising an order of play of said personalized prompts determined by said business rules engine based on said customer profile.

5. The personalized self-service channel system of claim 2, wherein said business rules engine further comprises rules-based personalization based on one or more of: logic constructs; and static constructs.

6. The personalized self-service channel system of claim 1, further comprising:
   a prompt processor for fulfillment of said selected menu options, wherein said personalized prompts further comprise:
   prompts built in textual form to be played to said customer; and
   a text-to-speech to engine for playing said personalized prompts to said customer.

7. The personalized self-service channel system of claim 6, wherein said text-to-speech engine further comprises a text-to-speech voice persona comprising a synthesized voice.

8. The personalized self-service channel system of claim 1, further comprising a prompt processor for fulfillment of said selected menu options, wherein said personalized prompts further comprise concatenated pre-recorded words.

9. The personalized self-service channel system of claim 8, further comprising:
   an audio library comprising recordings of all words that could be selected as audio options for said personalized prompts;
   wherein said prompt processor concatenates said selected menu options into a complete sentence to be played as said personalized prompts to said customer.

10. The personalized self-service channel system of claim 9, wherein said recordings of all words that could be selected as audio options further comprise one or more of;
    up-prosody to be said at a beginning of said sentence;
    equity-prosody to be said at a middle of said sentence; and
    down-prosody to be said at an end of said sentence.

11. The personalized self-service channel system of claim 1, further comprising a prompt processor for fulfillment of said selected menu options, wherein said personalized prompts further comprise pre-recorded prompts.

12. The personalized self-service channel system of claim 11, further comprising:
    an audio library comprising recordings of said pre-defined prompts;
    wherein said prompt processor selects said pre-defined prompts corresponding to said selected menu options from said audio library of pre-defined prompts to be played as said personalized prompts to said customer.

13. The personalized self-service channel system of claim 12, wherein said recordings of pre-defined prompts further comprise prompts recorded by a mainstream speech persona.

14. The personalized self-service channel system of claim 1, wherein said customer information further comprises one or more of:
    customer personal information;
    customer call history;
    customer products;
    customer services;
    customer pending claims;
    customer pending applications; and
    customer assets.

15. The personalized self-service channel system of claim 14, wherein customer personal information further comprises one or more of: a customer name; an address; a phone number; a member number; an account number; a PIN; and a password.

16. The personalized self-service channel system of claim 1, wherein said self-service channel further comprises a speech self-service application.

17. The personalized self-service channel system of claim 1, wherein said self-service channel further comprises an interactive voice response self-service application.

18. The personalized self-service channel system of claim 1, wherein said self-service channel further comprises a single access telephone number and a plurality of lines of business comprising products and services.

19. The personalized self-service channel system of claim 1, wherein said customer identifier further comprises one or more of: an Automatic Number Identifier (ANI); an account number; a member number; and caller-identifying information.

20. The personalized self-service channel system of claim 1, further comprising an incentives program to drive customers to use said self-service channel, wherein financial incentives are awarded to customers for use of said personalized self-service channel.

21. The personalized self-service channel system of claim 1, wherein said personalized self-service channel further comprises a call center, wherein said call center comprises both automated call handling and live customer service representative call handling.

22. The personalized self-service channel system of claim 1, wherein said customer profile is developed using business rules having criteria set by a provider of said personalized self-service channel, wherein no action is required by said customer to build said customer profile.

23. The personalized self-service channel system of claim 1, wherein said customer profile further comprises a template with all possibilities for products and services for said customer.

24. The personalized self-service channel system of claim 23, further comprising a wizard having a business rule engine that analyzes customer information in said template, accesses individual pieces of audio recordings, and dynamically builds prompts from said individual pieces of audio recordings.

25. The personalized self-service channel system of claim 1, wherein said selected menu options further comprise a first level of products and/or services serviced by a call center, wherein said first level of products and/or services comprises at least one module representing a line of business, wherein said at least one module further comprises at least one financial services sector.

26. The personalized self-service channel system of claim 25, wherein said at least one financial services sector comprises one of: insurance, banking, financial planning, security, brokerage, investments, pre-approvals, caller contact preferences, caller history, and marketing campaigns.

27. The personalized self-service channel system of claim 25, further comprising a second level personalized menu option dynamically selected under said personalized menu options based on said selected first level menu option and said customer profile.

28. The personalized self-service channel system of claim 25, wherein said customer profile is shared across all modules serviced by said call center.

29. The personalized self-service channel system of claim 28, wherein repetitive parts of said call are automatically captured and shared across all modules.

30. The personalized self-service channel system of claim 1, further comprising channel integration to ensure customer receives consistent information across all products and services.

31. A call center system having a personalized self-service telephone channel comprising:
a telephone network interface;
a server in communication with said telephone network interface;
a self-service application for presenting call prompt options to a caller;
a database storing records of customer information;
an identifier for identifying a customer calling in to said call center;
wherein said identifier is used as a key to search said database to access said customer information for said customer caller;
a customer profile built from said customer information found in said database records, wherein the customer profile includes information regarding the customer's relationship to a party; and
personalized call prompts selected from audio records based on said customer profile, wherein said personalized call prompts optimize a customer caller experience and shorten call duration and a reward is provided to said customer based on a usage of said personalized self-service channel by said customer.

32. The call center system of claim 31, wherein said self-service application further comprises a self-service speech application.

33. The call center system of claim 31, wherein said self-service application further comprises a self-service interactive voice response application.

34. The call center system of claim 31, further comprising one or more customer service representative desktops for providing an opt-out option from said self-service application.

35. The call center system of claim 31, further comprising one or more third party vendor portals for transferring a call out to a third party vendor.

36. The call center system of claim 31, further comprising computer telephony integration to assist with handling of calls and to integrate said call across all channels supported by said call center.

37. The call center system of claim 31, wherein said customer information further comprises one or more of: products owned by said customer, personal information regarding said customer, recent solicits by said customer, recent pre-approvals, current product status, and/or caller history.

38. The call center system of claim 31, further comprising a prompt processor for selection of said audio records for the content of said personalized call prompts and for assembling said prompts in a play order based on said customer profile.

39. A non-transitory computer-readable medium having computer-readable instructions for:
establishing an incentive program;
associating said incentive program with a personalized self-service telephone channel;
providing notice of said incentive program to customers;
receiving a call from a caller;
identifying said caller as a customer;
personalizing said self-service option to said customer based on customer information specific to each customer, wherein the customer information specific to each customer includes information regarding the customer's relationship to a party;

providing said personalized self-service option to said customer; and providing a reward to said customer based on a usage of said personalized self-service channel by said customer.

40. The non-transitory computer-readable medium of claim 39, further comprising computer-readable instructions for increasing said reward based on said usage of said self-service channel.

41. The non-transitory computer-readable medium of claim 40, further comprising computer-readable instructions for increasing said reward as said customer's usage of said self-service channel increases.

42. The non-transitory computer-readable medium of claim 39, further comprising computer-readable instructions for decreasing said reward as said customer's usage of said self-service channel decreases.

43. The non-transitory computer-readable medium of claim 39, further comprising computer-readable instructions for transferring said reward to said customer.

* * * * *